United States Patent [19]

Schramm, Jr. et al.

[11] Patent Number: 5,773,811
[45] Date of Patent: Jun. 30, 1998

[54] METHOD FOR MARKING, CAPTURING AND DECODING MACHINE-READABLE MATRIX SYMBOLS USING ULTRASOUND IMAGING TECHNIQUES

[76] Inventors: Harry F. Schramm, Jr., 630 Shadowbrook Rd., Winchester, Tenn. 37398; William T. Yost, 797 Fawn La., Newport News, Va. 23602; Donald L. Roxby, 6405 Trailwood Dr., Huntsville, Ala. 35811; James D. Teed, 8690 Edgehill Dr., Huntsville, Ala. 35802

[21] Appl. No.: 659,471

[22] Filed: Jun. 4, 1996

Related U.S. Application Data

[63] Continuation of Ser. No. 320,819, Oct. 11, 1994, abandoned.
[51] Int. Cl.⁶ ............................................ G06K 7/10
[52] U.S. Cl. .................................... 235/472; 235/462
[58] Field of Search ................................. 235/472, 462, 235/435, 488, 489, 468, 469, 380; 128/660.1

[56] References Cited

U.S. PATENT DOCUMENTS

| | | | |
|---|---|---|---|
| 4,729,128 | 3/1988 | Grimes | 382/58 |
| 4,917,096 | 4/1990 | Englehart et al. | 128/660.1 |
| 5,324,923 | 6/1994 | Cymbalski | 235/454 |
| 5,324,925 | 6/1994 | Koenck | 235/472 |
| 5,347,115 | 9/1994 | Sherman | 235/472 |
| 5,386,106 | 1/1995 | Kumar | 235/462 |
| 5,428,212 | 6/1995 | Tani | 235/472 |
| 5,463,212 | 10/1995 | Oshima | 235/468 |
| 5,590,685 | 1/1997 | Chiang et al. | 128/661.01 |

*Primary Examiner*—Donald T. Hajec
*Assistant Examiner*—Karl Frech
*Attorney, Agent, or Firm*—Charles T. Silberberg; Lawrence N. Ginsberg; Terrell P. Lewis

[57] ABSTRACT

The invention is a method and apparatus for the application of machine readable matrix marking symbols, and especially two-dimensional matrix symbols, to a "host" substrate, optionally covering the symbols with protective layers, then using an ultrasound imaging apparatus to capture echo signals associated with the matrix symbols, then feeding the resultant information to a matrix symbol decoder to yield human-readable and video monitor displayable information.

5 Claims, 3 Drawing Sheets

METHOD FOR MARKING, CAPTURING AND DECODING MACHINE-READABLE MATRIX SYMBOLS USING ULTRASOUND IMAGING TECHNIQUES

This application is a continuation of application Ser. No. 08/320,819 filed on Oct. 11, 1994 now abandoned.

STATEMENT OF GOVERNMENT INTEREST

The Government has rights in this invention pursuant to Contract No. NAS 8-38550.

BACKGROUND OF THE INVENTION

1. Field of the Invention

The present invention is directed to methods and apparatus for detecting, evaluating, and displaying identification symbols or other markings which may be found on various items, and more particularly to an acoustic micro-imaging (AMI) system, including a system-driving algorithm, for reading and displaying human-readable and two-dimensional matrix symbol data obscured by a coating process, or for detecting, evaluating and displaying surface and subsurface material defects such as cracks, debonds, voids, foreign inclusions, and porosity.

2. Description of the Related Art

Traditional identification symbols have included circular, polar, and bar code symbols. Recently, a new symbol was disclosed in U.S. Pat. No. 4,924,078 to Sant'Anselmo et al. This symbol, known as the Vericode® symbol, is a two-dimensional matrix symbol in which the encoded data increases geometrically per increase in symbol size, as contrasted with the data in a bar code which increases linearly per increase in length.

The matrix code is more versatile inasmuch as it can be directly marked onto or into more diverse non-paper surfaces including metals.

In addition to showing a unique data-containing symbol, U.S. Pat. No. 4,924,078 also discloses a system for capturing an image of the symbol, determining the contents of the symbol and then displaying the decoded data contents. U.S. Pat. No. 4,972,475 to Sant'Anselmo discloses an authenticating pseudo-random code and apparatus. Both of these patents are assigned to Veritec, Inc. of Chatsworth, Calif.

As will be disclosed below, the present invention is directed to improved methods and apparatus for applying, capturing and decoding the compressed symbology embraced by the Vericode® symbol.

Compressed symbology technology is ideally suited to inventory marking of parts and components in, but not limited to, the aerospace, automotive, electronics, and pharmaceutical industries. Incorporation of compressed symbology into computer-based manufacturing, fabrication, and assembly applications can eliminate a major source of errors—i.e., data reentry—by eliminating the manual reentry of component identification data. Compressed symbology can add significant value to automated design and manufacturing, configuration management, modular tooling, robotics, and quality control.

Direct part marking has the potential of damaging the substrate, a risk not encountered with indirect marking approaches. The goal of the marking process is to make a readable, durable mark (in essence, a controlled defect) without disturbing the surrounding substrate. A number of ways of doing this are discussed in applicants' prior patent application, U.S. Ser. No. 08/164,492 filed Dec. 8, 1993.

Other methods known include those of U.S. Pat. No. 3,755,730 to Vogelgesang which involves the capture of alphanumeric images that have been coated with paint using a magnetic reader, U.S. Pat. No. 4,538,059 to Rudland which involves the infrared capture of bar code symbols that have been covered with protective lamina, and U.S. Pat. Nos. 4,452,082 to Miwa and 5,103,427 to Erdol et al. which involve the measure of physical characteristics of an object using ultrasound.

The effort to replace or re-identify components whose product identification marks or tags have been lost or damaged costs governments and businesses millions of dollars a day worldwide. Many manufactured products are re-identified at least once before they are packaged and sold. In the case of some large-scale production parts, re-identification may occur as many as 15 times. The problem occurs as the products pass through the numerous surface treatment, coating and cleaning processes associated with modern manufacturing. For some products, this problem continues beyond manufacturing.

One example is the space shuttle solid rocket booster (SRB), which is refurbished after each mission. During the refurbishment process, its surface coatings are removed using a high-pressure water jet containing ground walnut shells. This automated process, which was designed to effectively remove surface coatings, also removes part identification numbers. These numbers must then be systematically reapplied to prevent loss of traceability, thereby adding significant time and cost to the program.

OBJECTS AND SUMMARY OF THE INVENTION

It is therefore a principal object of the present invention to provide an improved method and apparatus for applying, and then later capturing and decoding, machine-readable matrix symbol markings on substrate materials using ultrasound imaging techniques, and thus overcoming many of the drawbacks and disadvantages of known similar methods and apparatus.

Another object of the present invention is to provide a method and apparatus for applying to a substrate machine-readable matrix symbols using a material having acoustic impedance properties that differ from the acoustic impedance properties of the material of which the "host" part or component is comprised.

Still another object of the invention is to provide an ultrasound imaging method and apparatus for applying and later capturing machine readable matrix symbols that are raised or depressed relative to the host material surface.

Yet another object of the invention is to provide an ultrasound imaging system of either full-size proportions or of hand-held, miniaturized, and portable proportions where both systems are portable and are capable of locating machine readable, information-containing marking symbols on component surfaces for the purpose of effecting part identification and cataloguing, or for the purpose of identifying material flaws in the course of nondestructive inspection procedures carried out on preselected components.

These and other objects are accomplished through the application of machine readable marking symbols, and especially machine readable two-dimensional matrix symbols, to a host substrate, optionally covering the symbols with protective layers, and then using an ultrasound imaging apparatus to capture the matrix symbols, whereupon the resultant information is fed to a matrix symbol reader and decoder to yield human-readable information.

Other objects, advantages, and novel features of the present invention will become apparent from the following detailed description of the invention when considered in conjunction with the accompanying drawings.

DETAILED DESCRIPTION OF THE PREFERRED EMBODIMENTS

Machine readable matrix symbols are a special class of optically-scannable symbols which use squares instead of variable widths of spaces and line, such as are used in bar codes, to represent data. This single factor alone makes the matrix symbol format more robust and versatile than its more well-known predecessor, the bar code format.

In the matrix code format, all data is represented by equal sized units, i.e., data cells. It is a sequence of black data cells representing a binary "1" and white data cells representing a binary "0". Strung together in specific sequences, the symbol represents alpha-numeric characters. The equal-sized data cells provide for an easier decoding logic decision process than that for bar codes; the only decision the decoding software has to make is the determination of the binary value of the data cell and not the measure of distances or timing between the cells. The matrix code's overall configuration is generally a square, since that provides the easiest means of achieving omni-directionality when decoding the symbol. However, the matrix code can be implemented in a rectangular format. The equal size and the binary valuation of the data cells enables ease of decoding in the logic decision process.

Figure 1:
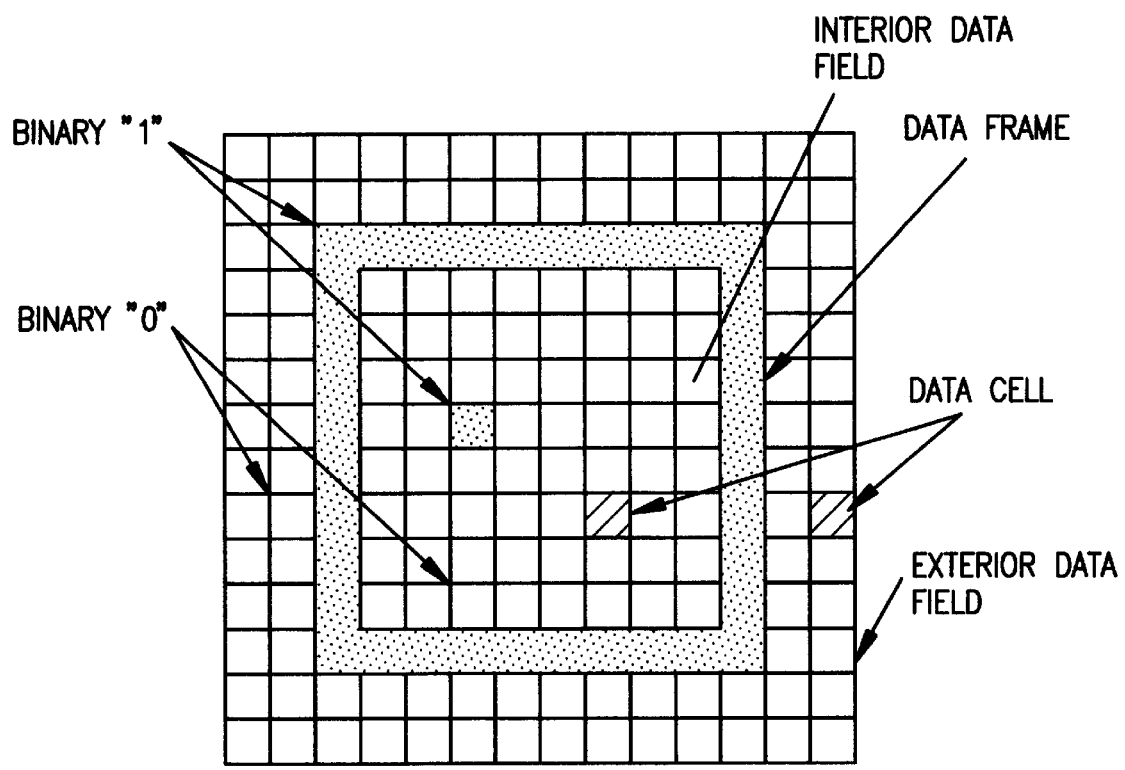
FIG. 1 illustrates the basic elements of a conventional matrix code symbol.

The basic elements of a matrix symbol are illustrated in FIG. 1. Although shown as a square, matrix symbols may possess any shape, including circular, rectangular, triangular, etc.

Figure 2:
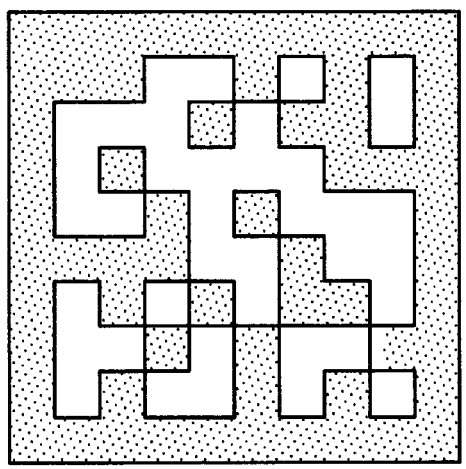
FIG. 2 illustrates a completed Vericode® symbol.

One embodiment of a matrix symbol, known as a Vericode® symbol, is shown in FIG. 2. The Vericode® symbol is disclosed and claimed in U.S. Pat. Nos. 4,924,078 and 4,972,475, the disclosures of both patents hereby being incorporated by reference. As with most matrix symbols, Vericode® symbols are data structures that are generally decodable from any direction or orientation, i.e. left, right, top or bottom.

Typically, in carrying out a marking process to apply a matrix symbol, the following considerations must be balanced: a) the data density of the symbol; b) the method of marking; c) the marking resolution; and d) the material surface, topography, hardness, reflectivity, environment and texture.

The environmental hazards that will have an affect upon the marking process and therefore the readability of the matrix symbol and are usually found on metal surfaces are: (a) pits, (b) spots, (c) scratches, and (d) stains.

Typically, pits cause a blooming effect when viewed by a detecting device and are interpreted by the decoding software as a white data cell, or if the pit causes a shadow, the software will interpret it as a black data cell.

Another imaging problem is caused by spectral reflection, which is interpreted as white data cells or, if a shadow is formed, the software will interpret the area as black data cells depending upon the background color. Scratches and stains either partially or fully obliterate smaller underlying data cells.

Manual marking methods are slow, error-prone, costly, and not compatible with today's advanced and automated manufacturing techniques. The preferred matrix symbology utilizing the present invention consists of an x/y array of data cells and is a digital representation of analog information. It is generated by a micro processor-based system which controls the marking device. The preferred matrix symbology is ideally suited to being marked onto items, including metal, using micro-controlled marking equipment that features x,y and/or z coordinate movement of the marking head, the underlying table, or combination of both of them.

The use of a marking device incorporating x, y and/or z coordinated movement has advantages over those that do not. These systems provide for:

a) Automatic control over the positioning of the matrix symbol in relation to the item being marked.

b) Automatic control over the height (z-axis) positioning.

c) Automatic control over the width (x-axis) positioning.

d) Automatic control over the length (y-axis) positioning.

e) Automatic control over the speed of the marking process.

f) Automatic control over the force of the marking process.

g) Automatic control over the supplies being used in the marking process, e.g. ink, thread, paint, etc.

h) Repeatable settings.

i) Communications with digitally-based or oriented numerical control manufacturing systems, CAD (computer aided drafting) systems, CAM (computer aided manufacturing) systems, CIM (computer integrated manufacturing) systems, etc.

j) Facilitation of automated manufacturing and marking of items, eliminating manual marking operations.

k) Control of marking by computer or by the item marking data entered into a database automatically for the purpose of file update.

Acoustic microscopy is a term which applies to nondestructive, high-resolution, high-frequency ultrasound inspection techniques that produce images beneath the surface of a sample. Compared to conventional ultrasound imaging techniques, which operate in the 1 to 10 MHz frequency range, acoustic microscopes operate up to an beyond 1 GHz, where the wave length is very short and the resolution is correspondingly high.

Three types of acoustic microscopy are in use in industry today. The scanning acoustic microscope (SAM) and the C-mode scanning acoustic microscope (C-SAM) are reflection mode instruments. The scanning laser acoustic microscope (SLAM) transmits a continuous plane wave of ultrasound through the entire sample thickness. The present invention employs a modified form of the C-mode scanning acoustic microscope.

The C-SAM system is embodied as a fixed workstation that uses a transducer with an acoustic lens to focus the ultrasonic waves at or below the sample surface. The transducer is mechanically translated (scanned) across the sample in a raster fasion to create the image. The C-mode scanning acoustic microscope can image several millimeters or more into most samples and is ideal for analyzing at a specific depth. Depth control is obtained by electronically gating the signal. The ultrasound signal is conducted to the sample by a coupling medium, usually deionized water or an inert fluid.

Figure 3:
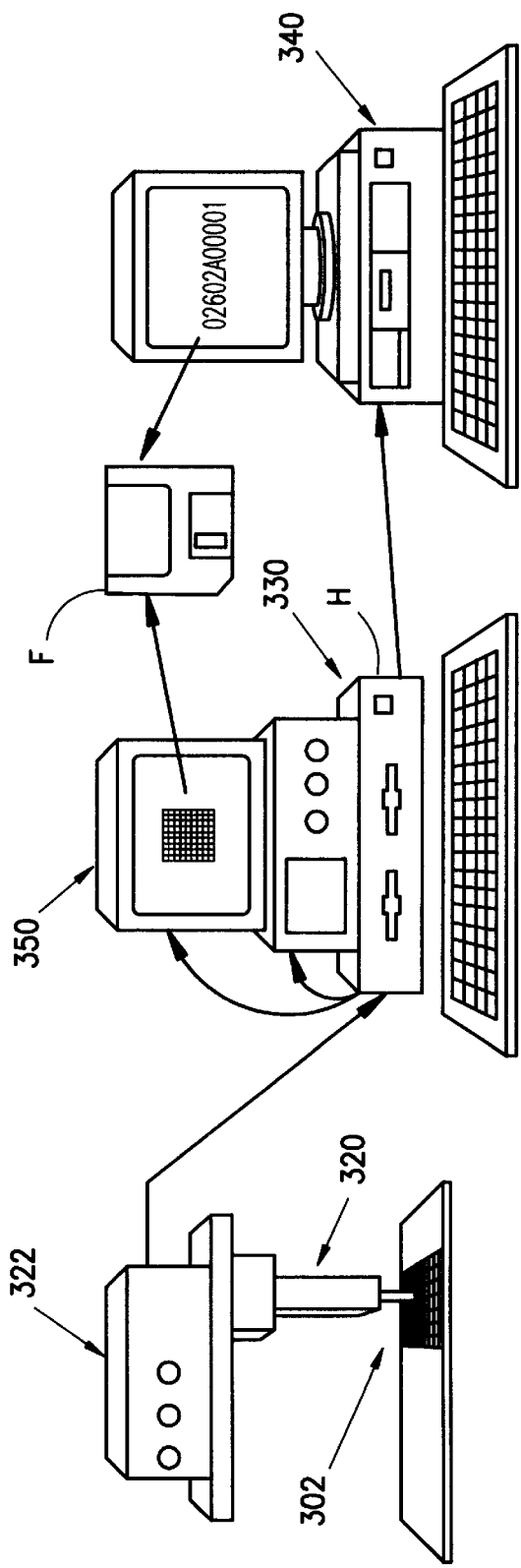
FIG. 3 is a schematic diagram of the apparatus of the present invention.

FIG. 3 is a schematic diagram of the inventive detection and decoding process and apparatus.

Machine-readable matrix symbols 302 produced by a code generation software package contained within a computer are initially applied to the components which require marking. The function of the code generation software package is to translate numeric/alpha-numeric bytes of data, entered by an operator, into a machine-readable matrix symbol. In connection with this invention, a marking device is used to apply the symbols to the components. A marking device driver software package acts as an interface between the code-generation software package and a computer. The driver software is used to, (1) select the marking device to be used, (2) translate the matrix symbol contained within the code generation software into a format which can be recognized by the selected marking device, (3) provide the operator with provisions to enter marking device settings directly into the software or via menu(s) arranged by material type, (4) provide the operator with a method to automatically reset the marking parameters on the marking device to match those selected in the software and, (5) direct the marking device to apply the machine-readable matrix symbol directly on the material.

Exemplary methods of marking machine readable matrix symbols onto substrate materials have been described in applicants' co-pending patent application U.S. Ser. No. 08/164,492, filed on Dec. 8, 1993. The marking methods which are contemplated by the present invention involve either the application of a material with acoustic impedance properties that differ from the acoustic impedance (density) properties of the "host" material, or the formation of a matrix symbol which is raised or depressed relative to the material surface.

The above described marking methods may be used on various types of materials including aluminum, copper, and nickel alloys; heat and corrosion resistant steels; tool steels; reactive and refractive metals; coated, plated and/or special conditioned metals; polymeric material; polymeric laminates; rubber; glass and ceramics; and other non-metals.

Over an extended period of time, the symbol can be visible or obscured by paint, corrosion, contaminants, discoloration or obstructions. However, with the present invention, the symbols can be captured from either side using ultrasound imaging apparatus, and then decoded.

In order for ultrasound to capture a machine-readable matrix symbol with sufficient resolution and contrast for decoding, the symbol must produce a change in acoustical impedance or variation in the reflected acoustical pattern, or both. Variations in the reflected acoustic pattern are produced when the symbol is either raised or recessed relative to the host material surface, or produces a change in surface density. The image capturing method of the present invention can use an ultrasound C-Scan operating at 15 MHz or a scanning acoustic microscope operating at 100 MHz.

Referring again to FIG. 3, the image capturing method of the present invention is shown to involve an ultrasound transducer 320 which is functionally coupled to a raster scanner 322 for detecting a matrix symbol 302. The transducer 320 functions to send and receive the ultrasound signal, and is physically scanned over the component bearing the two-dimensional matrix symbol in a raster pattern. A coupling medium, such as rubber, or deionized water or some other inert fluid, conducts the ultrasound energy to the component. The transducer alternates between sending focused spots of ultrasound energy toward the component and receiving the resulting echoes. Variations in material homogeneity are detected as variations in time, amplitude, and polarity of the echo pattern. The resulting image is transmitted to a computer 330 for storage on its hard disk H or on a floppy disk F, or transmitted to a matrix symbol decoding system 340, or displayed on a CRT 350.

Figure 4:
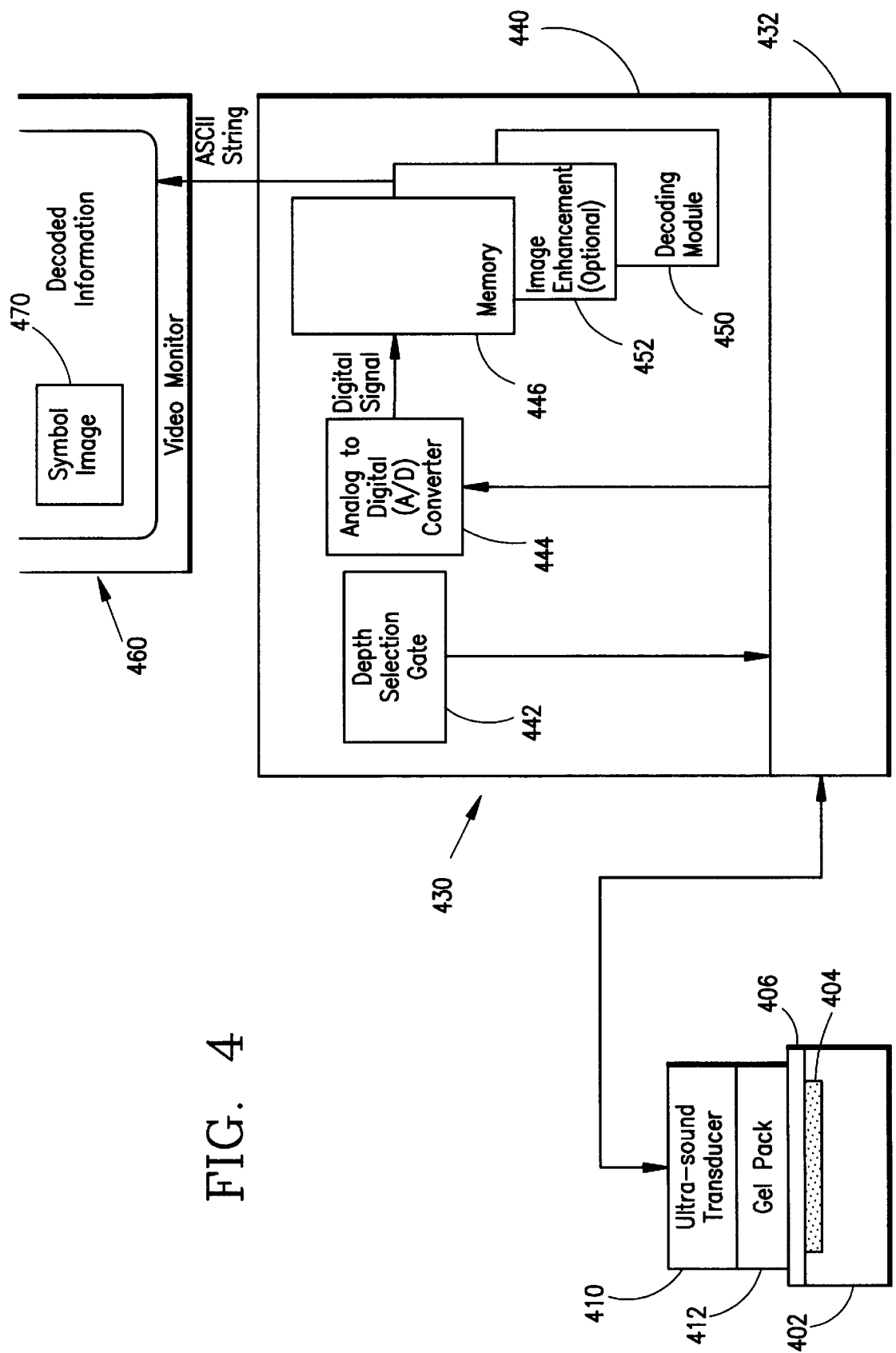
FIG. 4 illustrates one embodiment of apparatus contemplated by the present invention.

FIG. 4 illustrates the basic components of the system of the present invention. As shown, the component 402 bears a matrix symbol 404 which may optionally be covered with a surface coating or layer 406, such as paint, varnish, corrosion, etc. The ultrasound transducer 410 carries a gel pack 412 which acts as the sound transmission medium for ultrasound energy delivered to the transducer by the pulser located in a signal processing portion 432 of the equipment 430. Also located in portion 432 is a receiver to which is transmitted echo information from the transducer. A depth selection gate 442 in computer 440 enables determination of how far into the component the sound wave signals are to be transmitted. Signals received by the signal processing portion 432 are passed to an analog-to-digital (A/D) converter 444 which converts the analog signals to digital signals. The digital information is stored in a memory section 446 of the computer 440.

A decoding module 450 collects the digital signal information and alters its form to an ASCII string. An image enhancement module 452 may optionally be coupled to the decoding module of the computer before the signals are converted. The ASCII information string is passed on to the video monitor 460 where the symbol image 470 is presented.

Figure 5:
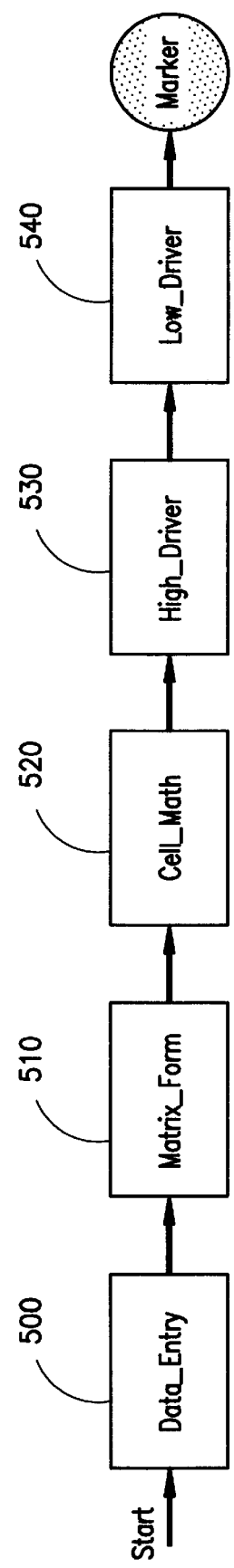
FIG. 5 illustrates a flow chart of the driver software utilized by the present invention.

Referring now to FIG. 5, a flow chart of the driver software is illustrated. Data is entered as indicated by numeral designation 500. Data entry 500 is made via keyboard, alternative machine readable symbol, file, communications link (LAN, modem, RF link, serial port), application, data base, data transform, data encrypt or data encode. A matrix is formed as designated by numeral designation 510. The parameters input include size, geometry, cell colors, control data, and dimensions. Certain mathematical computations are made, as designated by block 520. The parameters include the size of the cell, start position, cell parameters, orientation, timing, code, ENC, RED, EDAC. High driver 530 includes parameters such as marker parameters, material types, compensation factors, color parameters, and verify parameters. A low driver 540 includes a drive marker.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A method of identifying machine readable matrix symbol markings on a component, comprising the steps of:

applying a machine-readable matrix symbol to a surface of a component, said symbol exhibiting properties which are recognizable by ultrasound imaging apparatus, capturing said matrix symbol at a later time using a hand held portable ultrasound apparatus which utilizes a transducer coupled to a raster scanner, and decoding said matrix symbol, wherein said step of capturing comprises collecting sound signals echoing from the component and transmitting the signals to a memory component, and wherein said step of applying a machine-readable matrix symbol to a surface of a component, comprises the further step of covering said machine-readable matrix symbol with a non-transparent surface coating.

2. The method of claim 1, wherein said step of decoding said matrix symbol includes displaying an image on a video medium.

3. The method of claim 2, wherein said step of collecting sound signals echoing from the component and transmitting the signals to a memory component further comprises passing the analog sound signals through an A/D converter to generate a digital signal string.

4. The method of claim 3, further including a step of transmitting signals from said memory component through a decoding module to convert said digital signal string to an ASCII data string.

5. The method of claim 4, and further including a step of converting the ASCII data string to a video signal so that a symbol image can be displayed on a video monitor.

* * * * *